United States Patent [19]
Eyuboglu et al.

[11] Patent Number: 5,537,440
[45] Date of Patent: Jul. 16, 1996

[54] EFFICIENT TRANSCODING DEVICE AND METHOD

[75] Inventors: M. Vedat Eyuboglu, Concord; Mei Yong, Canton, both of Mass.

[73] Assignee: Motorola, Inc., Schaumburg, Ill.

[21] Appl. No.: 179,020

[22] Filed: Jan. 7, 1994

[51] Int. Cl.⁶ .................................................. H04B 14/06
[52] U.S. Cl. ........................ 375/245; 375/243; 348/405; 348/418
[58] Field of Search ................... 375/27, 26, 30, 375/122, 243, 244, 245, 240; 341/50, 94, 200, 50; 348/405, 419, 418, 405, 418

[56] References Cited

U.S. PATENT DOCUMENTS

| | | | |
|---|---|---|---|
| 4,411,001 | 10/1983 | Van Buul et al. | 375/30 |
| 4,972,260 | 11/1990 | Fujikawa | 348/405 |
| 5,072,295 | 12/1991 | Murakami et al. | 348/405 |
| 5,202,685 | 4/1993 | Nagata | 375/27 |
| 5,204,677 | 4/1993 | Akagiri et al. | 341/200 |
| 5,283,814 | 2/1994 | Iwahashi et al. | 375/27 |
| 5,333,012 | 7/1994 | Singhal et al. | 348/405 |
| 5,349,383 | 9/1994 | Parke et al. | 348/405 |

Primary Examiner—Stephen Chin
Assistant Examiner—T. Ghebretinsae
Attorney, Agent, or Firm—Darleen J. Stockley

[57] ABSTRACT

The present invention provides a transcoder for transcoding of digitally encoded bit streams produced by predictive encoders. The transcoder of this invention is less complex than previously known transcoders in terms of both computational and storage requirements. This efficiency is achieved by combining decoding and re-encoding steps into one step. This one-step transcoding is accomplished by modifying the originally quantized vectors and then requantizing and noiseless encoding these vectors into a bit stream in accordance with a predetermined objective.

36 Claims, 6 Drawing Sheets

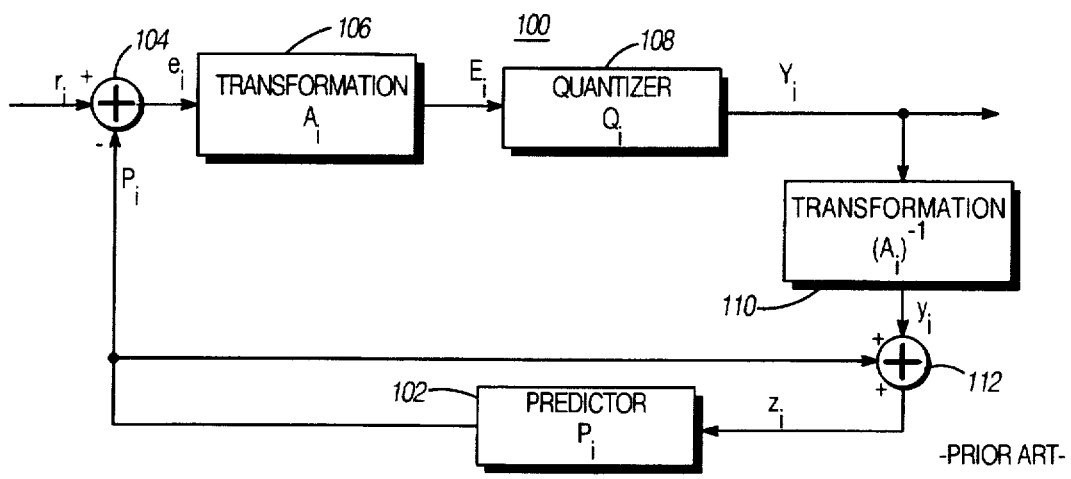
FIG.1 -PRIOR ART-
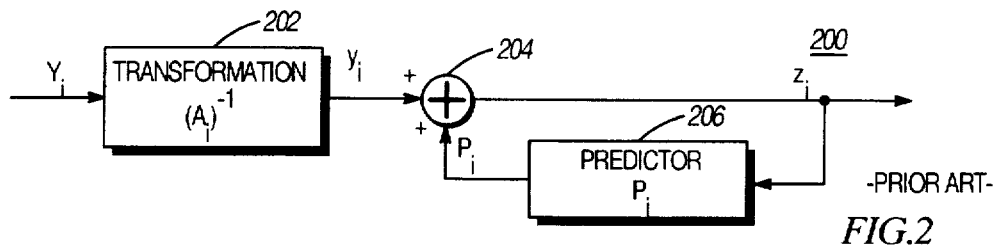
FIG.2 -PRIOR ART-
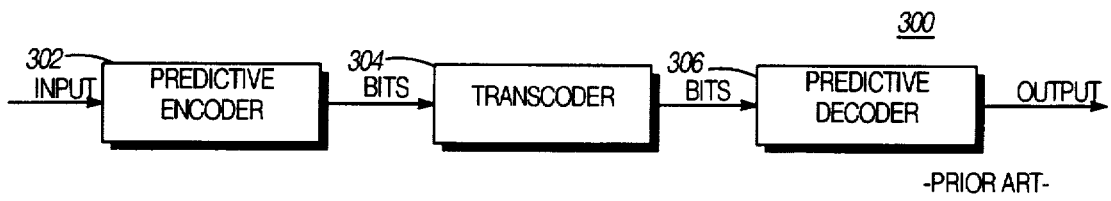
FIG.3 -PRIOR ART-
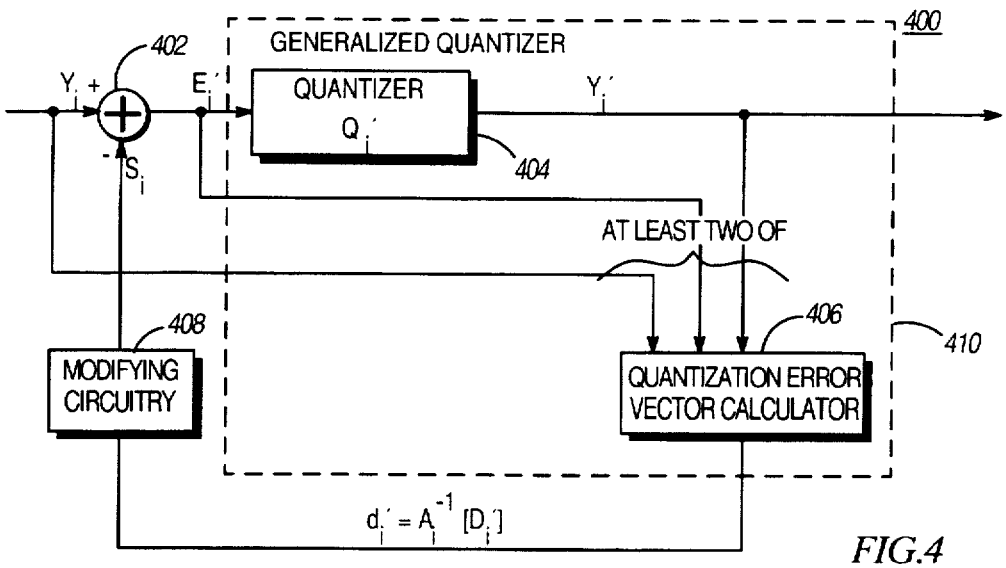
FIG.4

5,537,440

1

EFFICIENT TRANSCODING DEVICE AND METHOD

FIELD OF THE INVENTION

This invention relates generally to transcoding of digitally encoded signals, and more particularly to transcoding of signals that are digitally encoded by predictive coders.

BACKGROUND

A predictive waveform encoder is a device for compressing the amount of information in a waveform (e.g., speech, image or video) by removing the statistical redundancy among its neighboring samples using prediction methods. Several ITU-T Recommendations for speech coding (ITU-T stands for the Telecommunication Standardization Sector of the International Telecommunication Union; ITU-T is formerly known as CCITT, or International Telegraph and Telephone Consultative Committee), have adopted predictive coding techniques (for example, differential pulse-code mudulation, or DPCM, is used in Recommendation G.721). In these predictive speech coders, an original speech sample is predicted based on past speech samples, and the prediction error (the difference between the original and the predicted samples), instead of the original sample, is quantized, and then digitally encoded by a noiseless coder to a bit stream. Since the energy of the prediction error is, on average, much smaller than the original speech signal, a high compression ratio can generally be obtained.

Predictive coding methods have also been used for image and video compression. In these applications, the spatial correlation among neighboring pixels in an image and, in the case of video, the temporal correlation between successive images can be exploited.

Typical predictive coders perform the prediction based on a replica of the reconstructed waveform. This ensures that the quantization error does not accumulate during reconstruction. Although the prediction accuracy is reduced (for coarse quantization), overall compression performance is generally improved.

State-of-the-art digital video coding systems utilize transform coding for spatial compression and a form of predictive coding known as motion-compensated prediction (MCP) for temporal compression. Video compression techniques that have recently been adopted in international standards (e.g., the MPEG standard developed by the International Standards Organization's Motion Picture Experts Group (ISO's MPEG) and ITU-T's H.261), or others that are under consideration for future standards, all employ a so-called block-matching MCP technique. In this method, each image in a video sequence is partitioned into N×N blocks, called macro blocks (MB's), where N is a predetermined integer. For each MB, a replica of the previously decoded image is searched to find an N×N window that best resembles that MB, and the pixels in that window are used as a prediction for that MB. The prediction error is then encoded using a combination of transform coding and scalar quantization followed by variable-length noiseless encoding.

Transcoding will be required in many applications of compressed digital video. For example, in some instances, it may be desirable to change the rate of a digital video bit stream in the network. Alternatively, when constant bit-rate (CBR) video traffic is to be carried over a cell-relay or Asynchronous Transfer Mode (ATM) network, it may be desirable to convert the CBR stream into a variable bit-rate (VBR) stream to save bandwidth through statistical multiplexing. Transcoding may also be required for conversion between two video compression formats. For example, it may be necessary to convert an MPEG-encoded video bit stream into an H.261 bit stream, or vice versa. Another important application of transcoding is multipoint video conferencing; here, transcoding may be needed to implement video mixing for continuous presence multipoint bridging.

FIG. 1, numeral 100, is a block diagram schematic of a predictive waveform encoder as is known in the art. A sequence of vectors consisting of a group of samples $r_i$ taken from an original waveform are processed to generate a sequence of quantized vectors $Y_i$, where i=0, 1, . . . is a time index indicating the order in which the input vectors are processed. The dimensionality L of the input vectors is arbitrary. In typical speech applications L=1, whereas in many video compression applications, L>1.

The encoder operates iteratively such that: (1) a predictor unit (102) generates a prediction of the input vector $r_i$ represented by the vector $p_i$ based on one or more past reconstructed vectors $z_j$, j<i, using a predetermined linear prediction operator $P_i$; (2) the vector $p_i$ is subtracted from $r_i$ at a first combiner (104) to obtain the prediction error vector $e_i=r_i-p_i$, wherein the predictor $P_i$ is typically chosen to minimize the average energy of the prediction error $e_i$; (3) the prediction error vector $e_i$ is transformed by a transformation unit (106) according to $E_i=A_i[e_i]$, where $A_i[\ ]$ represents a linear transformation; (4) the vector $E_i$ is quantized using a quantizer $Q_i$ (108) to obtain the quantized vector $Y_i=E_i+D_i$, where $D_i$ is a quantization error vector, and the quantized vector $Y_i$ is encoded into a binary word using a noiseless encoding method (e.g., a Huffman code), and then it is transmitted or stored; (5) the quantized vector $Y_i$ is then inverse transformed at Inverse Transformation Unit $A_i^{-1}$ (110) to find the vector $y_i=A_i^{-1}[Y_i]$, where $A_i^{-1}[\ ]$ is an inverse transformation (i.e., $A_i^{-1}[A_i[x]]=x$); and (6) the vector $p_i$ is added by a second combiner (112) to $y_i$ to obtain the reconstructed vector $z_i=y_i+p_i$, which is stored for use in later iterations.

In most applications, the transformation $A_i$ is fixed a priori, i.e., is predetermined, whereas $Q_i$ and $P_i$ are varied using preselected adaptation algorithms. In some applications, the transformation $A_i$ is not used; then $A_i=I$, where I is an LXL identity matrix. In so-called forward adaptation, the parameters of $Q_i$, $P_i$ and $A_i$ are passed to the decoder as side information, while in so-called backward adaptation, $Q_i$, $P_i$ and $A_i$ are determined at the decoder from previously received information, so no side information needs to be sent.

Given the information on $Q_i$, $P_i$ and $A_i$, a decoder can reconstruct the vector $z_i$. The decoder (200) first recovers the quantized vectors $\{Y_i\}$ from the received bit stream by decoding the noiseless source code and then obtains $z_i$. As shown in FIG. 2, numeral 200, (1) the quantized vector $Y_i$ is first inverse transformed using the inverse transformation unit $A_i^{-1}$ (202) to obtain $y_i=A_i^{-1}[Y_i]$; (2) a predictor (206) obtains the prediction $p_i$ of the input vector $r_i$ from one or more past reconstructed vectors $z_j$, j<i, using the prediction operator $P_i$, as in the encoder; and (3) a combiner (204), operably coupled to the predictor (206) and to the transformation unit ($A_i^{-1}$) (202) adds the vector $p_i$ to $y_i$ to obtain the reconstructed vector $z_i$.

The reconstructed vector $z_i$ can be represented as $z_i=r_i+d_i$, where $d_i=A_i^{-1}[D_i]$ is an inverse-transformed version of the quantization error vector $D_i$. In other words, $z_i$ differs from the original vector $r_i$ only by $d_i=A_i^{-1}[D_i]$. To obtain good performance, the transformation $A_i$ is chosen such that the error $A_i^{-1}[D_i]$, or an appropriately weighted version of it, is kept small.

A transcoder first recovers the sequence of quantized vectors $\{Y_i\}$ from the received bit stream by decoding the noiseless source code, converts $\{Y_i\}$ into a sequence of transcoded vectors $\{Y_i'\}$, and then generates a new bit stream representing $\{Y_i'\}$ using the noiseless source code. The transcoder has full knowledge of the operators $Q_i$, $A_i$ and $P_i$ used at the original encoder and decoder, either a priori or through received side information.

In prior art "decode and re-encode" transcoding, a quantized vector $Y_i$ is first decoded using the decoder of FIG. 2 to obtain the reconstructed vector $z_i=r_i+d_i$ and then $z_i$ is re-encoded using an encoder, possibly with a different quantizer $Q_i'$, a different predictor $P_i'$ or even a different transformation $A_i'$, to obtain the transcoded vector $Y_i'$. The transcoded vector can be decoded by the decoder of FIG. 2 using $Q_i'$, $P_i'$ and $A_i'$. The final reconstructed vector $z_i'$ can then be represented as $z_i'=r_i+d_i+d_i'$, where $d_i'=(A_i')^{-1}[Q_i']$ is a transformed version of the quantization error introduced by the transcoder.

Although conceptually straightforward, the implementation of the decode and re-encode method can be quite costly because of its high computational and storage requirements. Thus, there is a need for an efficient transcoding device and method that can be implemented with low complexity.

SUMMARY OF THE INVENTION

A device and method provide transcoding a sequence of quantized vectors $Y_i$ generated by a predictive waveform encoder utilizing modified quantization error vectors $S_i$. The device includes: (1) an adder that is operably coupled to receive at least a first quantized vector $Y_i$ and at least a first modified quantization error vector $S_i$ and is used for generating a difference vector $E_i'=Y_i-S_i$ between the quantized vector $Y_i$ and the modified quantization error vector $S_i$; (2) a quantizer that is operably coupled to the adder and is used for quantizing the difference vector $E_i'$ to obtain a transcoded vector $Y_i'$; (3) a quantization error vector calculator (QEVC) that is operably coupled to receive at least two of the vectors $Y_i$, $E_i'$ and $Y_i'$ and is used for generating the inverse-transformed error vector $d_i'=A_i^{-1}[D_i']$, where $D_i'$ is a quantization error vector and $A_i^{-1}$ is an inverse transformation; and (4) modifying circuitry that is operably coupled to the QEVC and is used for generating the modified quantization error vector $S_i$ based on past values of the vector $d_i'$, where $S_i$ is input to the adder.

BRIEF DESCRIPTIONS OF THE DRAWINGS

FIG. 1 is a block diagram schematic of a predictive waveform encoder as is known in the art.

FIG. 2 is a block diagram schematic of a decoder that typically operates in conjunction with an encoder of FIG. 1, as is known in the art.

FIG. 3, numeral 300, is a general block diagram schematic of a system for transcoding.

FIG. 4 is a block diagram schematic of a device in accordance with the present invention.

Figure 5:
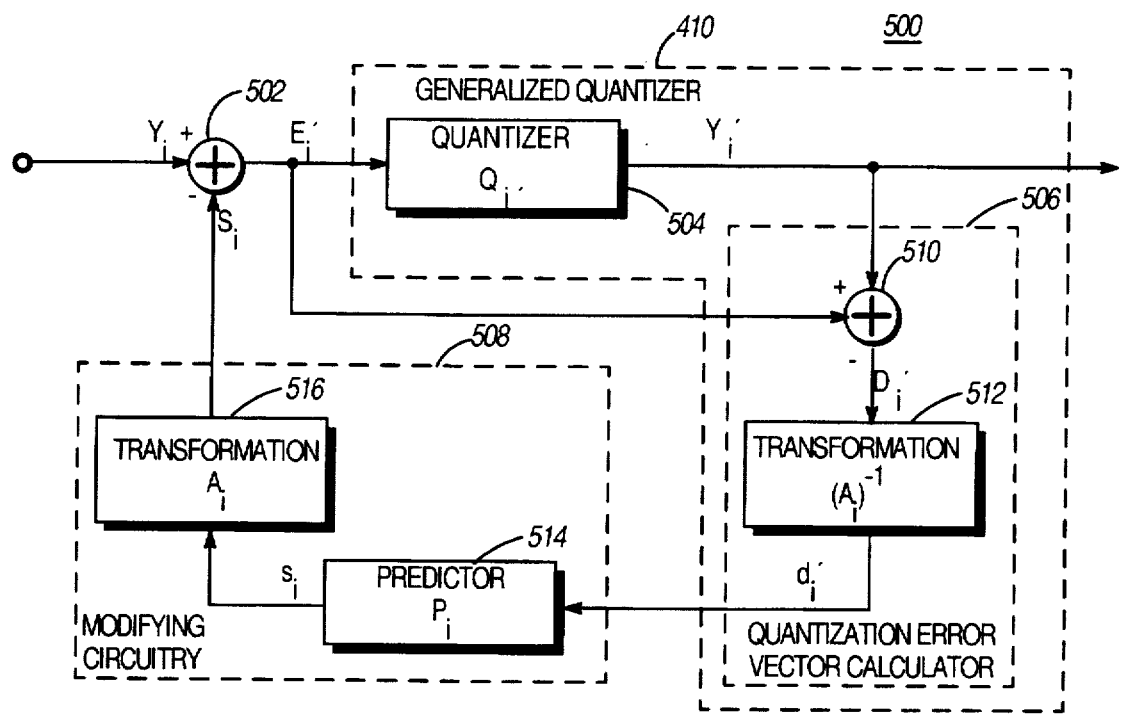

FIG. 5 is a block diagram schematic of the device of FIG. 4 shown with greater particularity.

Figure 6:
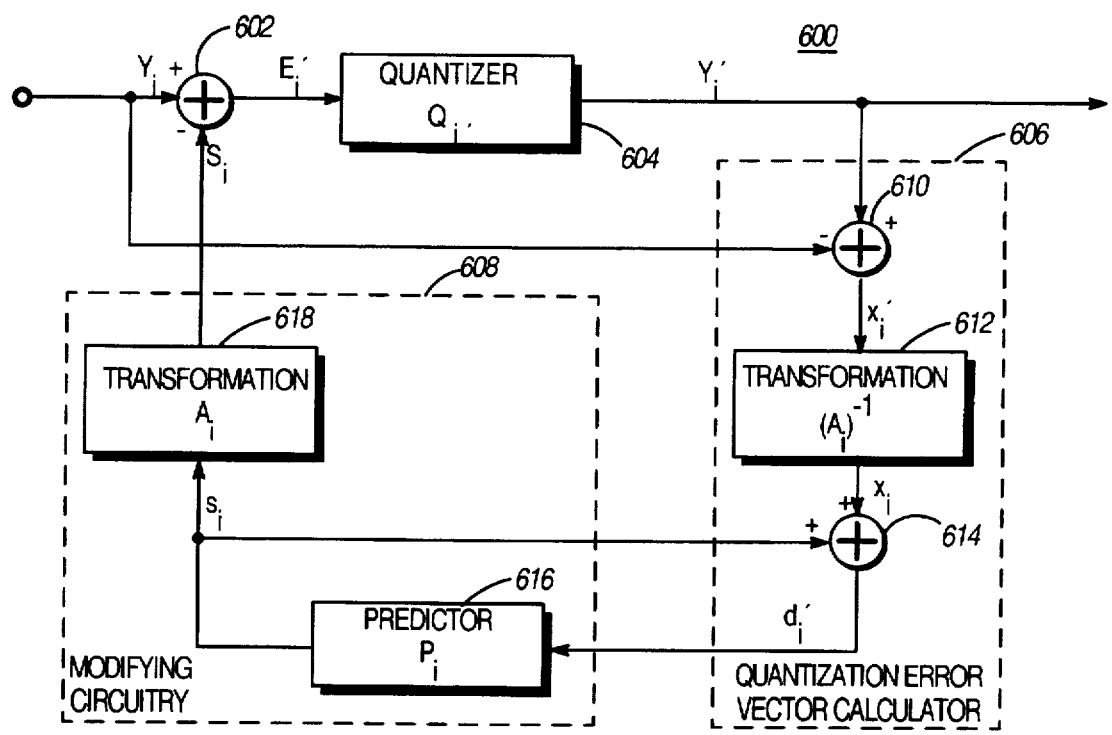

FIG. 6 is an alternative block diagram schematic of the device of FIG. 4 shown with greater particularity.

Figure 7:
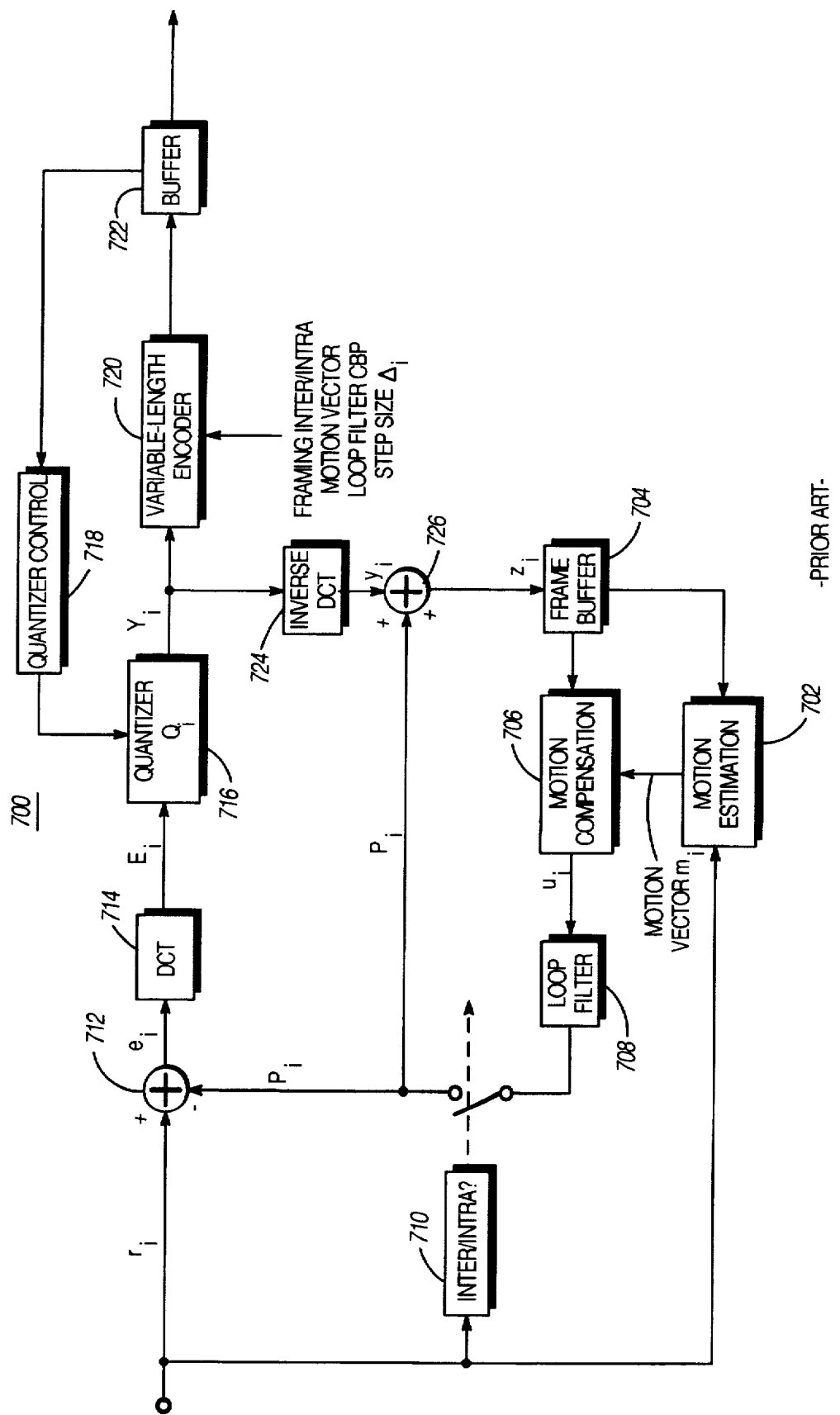

FIG. 7 shows a typical configuration of an H.261 video encoder, as is known in the art.

Figure 8:
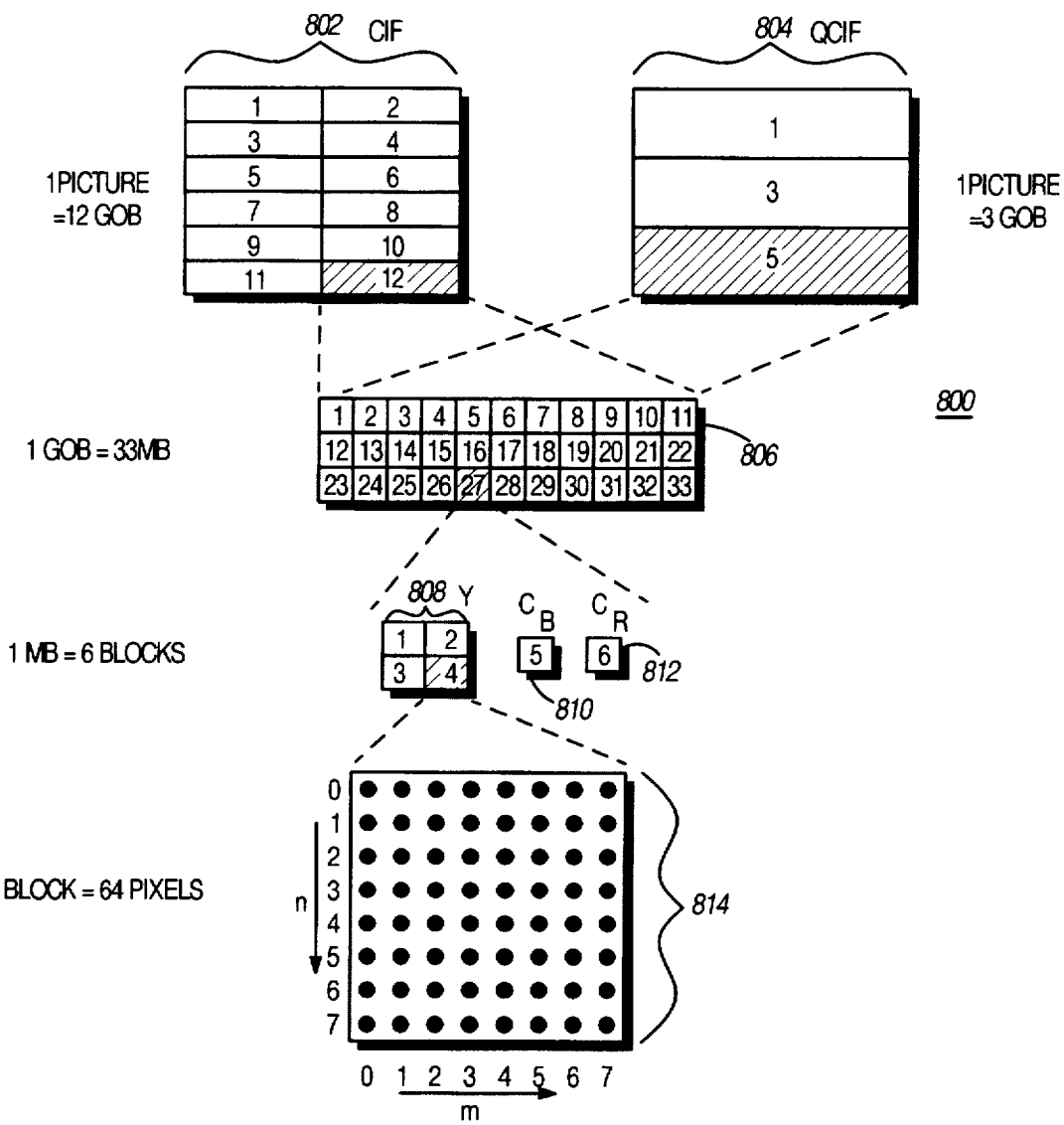

FIG. 8 illustrates the partition of an image into increasingly smaller blocks in the H.261 standard.

Figure 9:
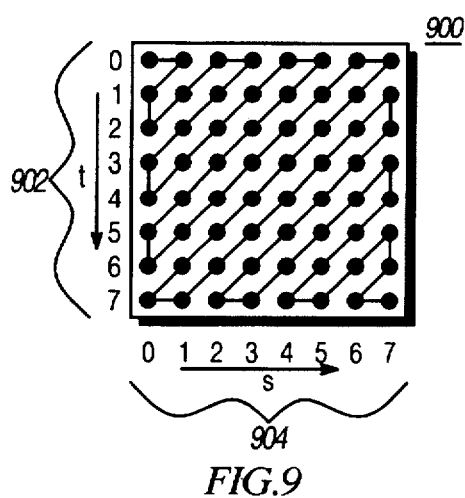

FIG. 9 shows the indexing of the coefficients in the transform domain for the H.261 standard.

Figure 10:
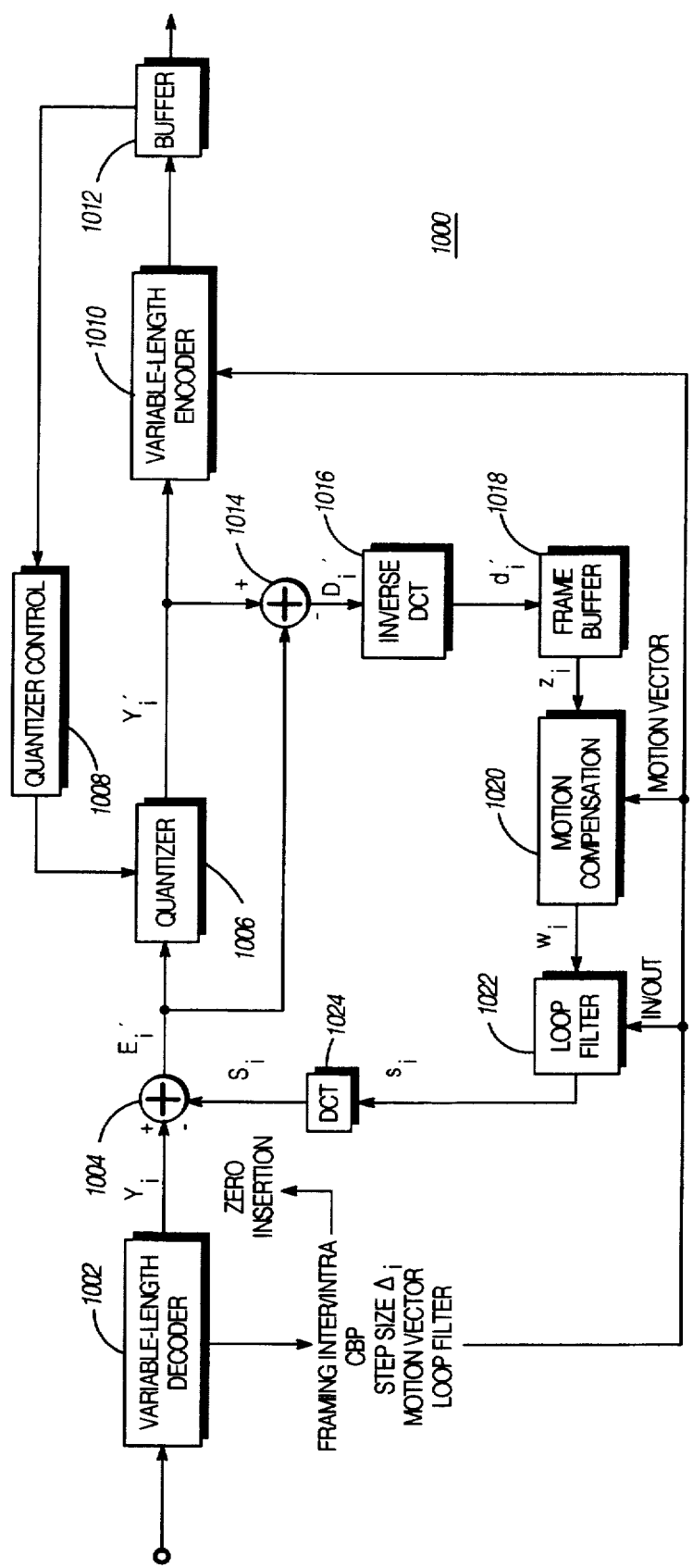

FIG. 10 shows a block diagram schematic of one embodiment of the one-step transcoder of the present invention.

Figure 11:
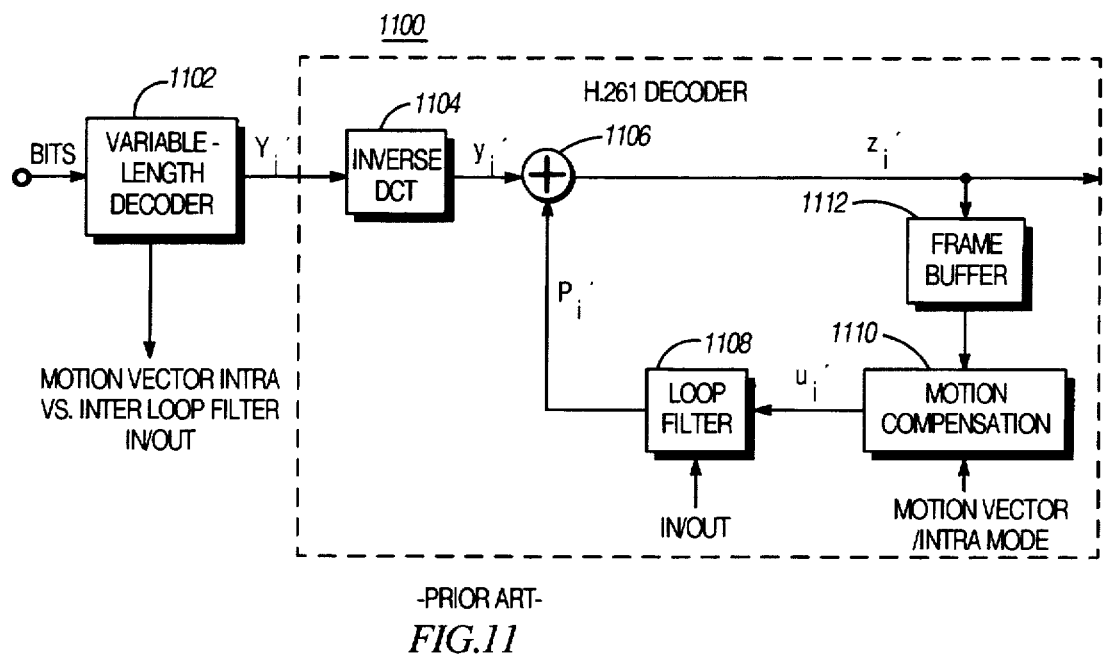

FIG. 11 is a block diagram schematic of an H.261 decoder as is known in the art.

Figure 12:
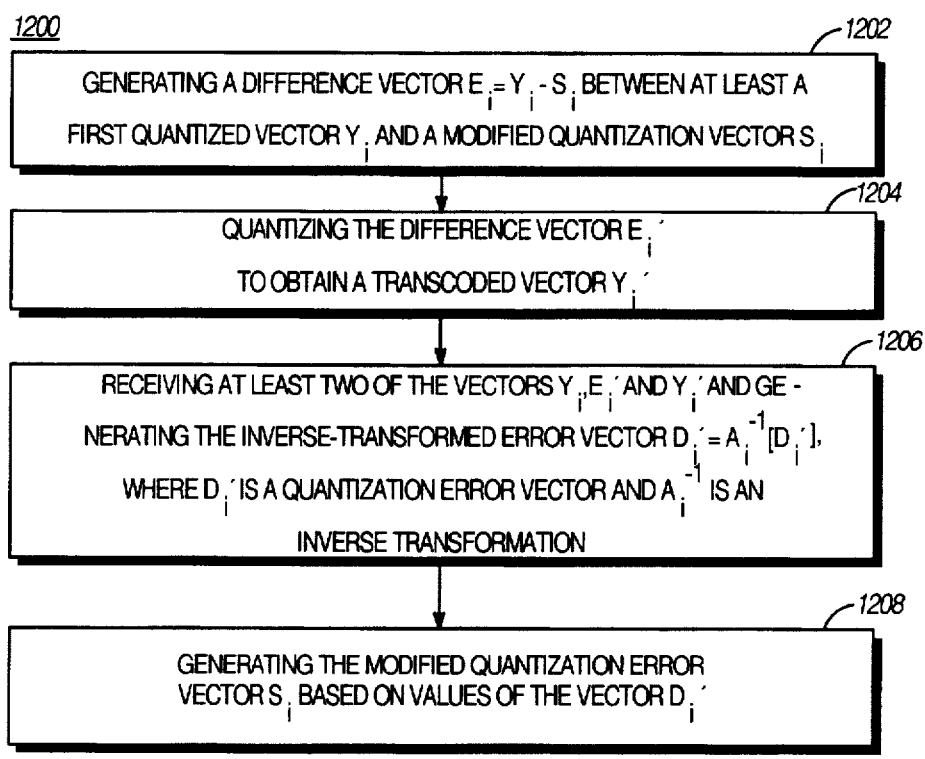

FIG. 12 is a flow chart of one embodiment of steps in accordance with the method of the present invention.

DETAILED DESCRIPTION OF A PREFERRED EMBODIMENT

FIG. 3, numeral 300, is a general block diagram schematic of a system for transcoding as is known in the art. The input of the transcoder (304) is a bit stream generated by a predictive waveform encoder (302) such as the H.261 video encoder. Its output is another bit stream which can be decoded by a predictive waveform decoder (306). The transcoder (304) modifies the bit stream according to a predetermined objective.

The transcoder device of the present invention, referred to herein as a "one-step transcoder," achieves the performance of the "decode and re-encode" transcoder with only two transformations and one prediction operation, provided that the predictor $P_i'$ and the transformation $A_i'$ used in the transcoder are the same as the operators $P_i$ and $A_i$ used in the original encoder, thus decreasing complexity in the transcoding operation. In addition, the one-step transcoder reduces the storage requirements.

In the one-step transcoder, shown in a block diagram schematic in FIG. 4, numeral 400, a modified version $S_i$ of the quantization error vector is subtracted from the received quantized vector $Y_i$, and the difference vector $E_i'$ is re-quantized to obtain the transcoded vector $Y_i'$. A quantization error calculator then computes the inverse-transformed quantization error vector $d_i'=A_i^{-1}[D_i']$, where $D_i'=Y_i-E_i'$ is the quantization error vector and $A_i^{-1}$ is an inverse transformation. A modifying circuitry determines the modified quantization error vector $S_i$ based on past vectors $d_j'$, $j<i$.

The present invention includes a device for transcoding a sequence of quantized vectors $Y_i$ generated by a predictive waveform encoder utilizing modified quantization error vectors $S_i$. The device (400) includes an adder (402), a quantizer (404), a quantization error vector calculator (QEVC) (406), and modifying circuitry (408). The adder (402) is operably coupled to receive at least a first quantized vector $Y_i$ and at least a first modified quantization error vector $S_i$ and is utilized for generating a difference vector $E_i'=Y^i-S_i$ between the quantized vector $Y_i$ and the modified quantization error vector $S_i$. The quantizer (404) is operably coupled to the adder (402) and is used for quantizing the difference vector $E_i'$ to obtain a transcoded vector $Y_i'$. The quantization error vector calculator (QEVC) (406) is operably coupled to receive at least two of the vectors $Y_i$, $E_i'$ and $Y_i'$ and is utilized for generating the inverse-transformed error vector $d_i'=A_i^{-1}[D_i']$, where $D_i'$ is a quantization error vector and $A_i^{-1}$ is an inverse transformation. The modifying circuitry (408) operably couples the QEVC (406) to the adder (402) and is used for generating the modified quantization error vector $S_i$ based on the past values of the vector $d_i'$.

In an alternate embodiment, the transcoding device of the present invention may be selected to include an adder (402), a generalized quantizer (410), and modifying circuitry (408). In this implementation, the adder (402) is operably coupled to receive at least a first quantized vector $Y_i$ and at least a first modified quantization error vector $S_i$ and is used for generating a difference vector $E_i'=Y_i-S_i$ between the quantized vector $Y_i$ and the modified quantization error vector $S_i$; the generalized quantizer (410) is operably coupled to the adder (402) and is used for quantizing the difference vector $E_i'$ to obtain a transcoded vector $Y_i'$, and for receiving at least one of the vectors $Y_i$ and $E_i'$ and generating an inverse-transformed error vector $d_i'=A_i^{-1}[D_i']$, where $D_i'$ is a quantization error vector and $A_i^{-1}$ is an inverse transformation; and the modifying circuitry (408) is operably coupled to the generalized quantizer (410) and is used for generating the modified quantization error vector $S_i$ based on past values of the vector $d_i'$.

One embodiment of the one-step transcoder device of FIG. 4 is shown with greater particularity in FIG. 5, numeral 500. The device includes a first adder (502), a quantizer (504), a quantization error vector calculator (QEVC) (506) that includes a second adder (510) coupled to an inverse transformation unit (512), and modifying circuitry (508) that includes a predictor (514) coupled to a transformation unit (516). The first adder (502) and the quantizer (504) are coupled as shown for the adder (402) and the quantizer (404), respectively, of FIG. 4. The second adder (510) is operably coupled to receive vectors $E_i'$ and $Y_i'$ and is utilized for generating the quantization error vector $D_i'$. The inverse transformation unit (512) is operably coupled to the second adder (510) and is utilized for generating the inverse-transformed error vector $d_i'=A_i^{-1}[D_i']$, where $D_i'$ is a quantization error vector and $A_i^{-1}$ is an inverse transformation. The predictor (514) of the modifying circuitry (508) is operably coupled to the inverse transformation unit (512) of the QEVC (506) and generates the predicted quantization error vector $s_i$. The transformation unit (516) is operably coupled to the predictor (514) and is used for transforming the predicted quantization error vector $s_i$ to vector $S_i$ as described more fully below and providing the modified quantization error vector $S_i$ to the first adder (502) based on past values of the vector $d_i'$.

Past inverse-transformed quantization error vectors $d_j'=A_i^{-1}[D_j']$, j<i, are passed through the prediction operator $P_i$ to obtain the the predicted quantization error vector $s_i$. The vector $s_i$ is transformed again to obtain the modified quantization error vector $S_i=A_i[s_i]$. Then the vector $S_i$ is subtracted from the received quantized vector $Y_i$ to obtain the error vector $E_i'=Y_i-S_i$. The error vector $E_i'$ is quantized using the quantizer $Q_i'$ (504) to obtain the transcoded vector $Y_i'=E_i'+D_i'$, where $D_i'$ is the quantization error vector introduced by the transcoder. The transformed quantization error vector $d_i'$ is obtained by first subtracting the vector $E_i'$ from $Y_i'$ (using the second adder (510)) to obtain the quantization error vector $D_i'=E_i'+Y_i'$, and then transforming $D_i'$ (using the inverse transformation unit (512)) to obtain $d_i'=A_i^{-1}[D_i']$.

The one-step transcoder generates the same transcoded sequence $\{Y_i'\}$ as the decode and re-encode transcoder. This can be shown by proving that the signal at the input of the quantizer is the same in both cases:

First consider the decode and re-encode transcoder. In this case, the input to the quantizer in the re-encoder can be written as $$B_i = A_i[z_i] - A_i[p_i]$$
$$= Z_i - A_i[r_{pi} + d_{pi} + d_{pi}'].$$

where $Z_i=A_i[z_i]$ is a transformed version of the decoder output $z_i$ (in the transcoder) and $r_{pi}$, $d_{pi}$ and $d_{pi}'$ represent the outputs of the predictor $P_i$ at time i if excited individually by the sequences $\{r_i\}$, $\{d_i\}$ and $\{d_i'\}$, respectively.

Similarly, the input of the quantizer in the one-step transcoder can be written as $$C_i = Y_i - A_i[d_{pi}'],$$
$$= Z_i - A_i[r_{pi} + d_{pi}] - A_i[d_{pi}'].$$

Since $A_i$ is a linear operator, it follows that $B_i=C_i$.

The present invention relies on the fact that the quantized vector $Y_i$ can be re-quantized without any error accumulation in the reconstruction, provided that a modified quantization error vector $S_i$ is added to $Y_i$ before re-quantization. This compensates for the transcoder quantization error added by the prediction loop in the reconstruction.

The one-step transcoder of the present invention can also be implemented in other ways. One alternative structure is shown in FIG. 6.

FIG. 6, numeral 600, sets forth a block diagram schematic of an implementation of a device in accordance with the present invention wherein the difference between the input $Y_i$ and the output $Y_i'$ is fed through the feedback loop. The quantization error vector calculator (606) includes a second adder (610) that is operably coupled to receive $Y_i$ and $Y_i'$ for obtaining said difference $\{X_i\}$, an inverse transformation unit (612) that is operably coupled to the second adder (610) for providing vector $x_i$, and a third adder (614) for receiving and combining $x_i$ and $s_i$, and modifying circuitry (608) that includes a predictor (616) that is operably coupled to the third adder (614), for utilizing $d_i'$ to provide the predicted quantization error vector $s_i$, and a tranformation unit (618) that is operably coupled to the predictor (616), for generating modified quantization error vector $S_i$. The difference in the implementation of FIG. 6 lies in the way the transformed quantization error vector $d_i'$ is generated:

The input vector $Y_i$ is subtracted from the transcoded vector $Y_i'$ to obtain the vector $X_i=Y_i'-Y_i$, which is then transformed to find $x_i=A_i^{-1}[X_i']$. The predicted quantization error vector $s_i$ is added to $x_i$ to determine $d_i'=x_i+s_i$.

That the inverse-transformed quantization vector $d_i'$ is the same in both structures can be shown by noting that the vector $x_i$ in FIG. 6 can be written as $$x_i=A_i^{-1}[Y_i'-E_i']-s_i'.$$

Therefore, the implementations of FIGS. 5 and 6 provide the same performance.

The one-step transcoder may also be utilized to change the rate of a bit stream generated by a video encoder operating according to the ITU-T Recommendation H.261. First, a typical configuration of an H.261 encoder is shown in FIG. 7, numeral 700.

The input to the encoder consists of a sequence of images scanned progressively at a nominal image rate of about 30 images per second. Each image consists of a luminance component Y and two color difference components CB and CR, sampled according to one of two formats, CIF (802) and QCIF (804), wherein:

CIF: 352 × 288 (Y), 176 × 144 (CR), 176 × 144 (CB)
QCIF: 176 × 144 (Y), 88 × 72 (CR), 88 × 72 (CB).

Each image is partitioned into increasingly smaller segments as illustrated in FIG. 8, numeral 800. CIF images are divided into 12 Group Of Blocks (GOB's) and QCIF images are divided into three GOB's. Each GOB (806) consists of 33 macro blocks (MB's), and a MB consists of four luminance blocks (808) and two color difference blocks (810, 812), where each block has 64 pixels (814) arranged on an 8×8 grid. Each pixel is represented by an integer between 1 and 254.

MB's are the fundamental coding elements in H.26. The six 8×8 blocks in a MB are numbered from 1 to 6 as shown in FIG. 8. Let $r_{i,k,m,n}$ represent the pixel in position (m,n) in the k'th block of the i'th MB, where i=0, 1, ..., k=1, ..., 6 and m, n=0, 1, ..., 7. Then the input vector $r_i$ for the i'th MB can be represented as:

$$r_i=[r_{i,1,0,0}, \ldots, r_{i,1,7,7}, r_{i,2,0,0}, \ldots, r_{i,2,7,7}, r_{i,3,0,0}, \ldots, r_{i,3,7,7},$$
$$r_{i,4,0,0}, \ldots, r_{i,4,7,7}, r_{i,5,0,0}, \ldots, r_{i,5,7,7}, r_{i,6,0,0}, \ldots, r_{i,6,7,7}].$$

The operation of the encoder in FIG. 7, numeral 700, for the i'th MB is described as follows: First, a motion estimation unit (702) utilizes an algorithm to determine a motion vector $m_i=(m_{i1}, m_{i2})$. Typically, the algorithm searches the luminance pixels in the previous reconstructed image (stored in a frame buffer (704)) to find a 16×16 window $W_i$ for which the "distance" between the pixels in that window and the corresponding pixels in the current MB is minimum. The motion vector mi represents the spatial offset between the window $W_i$ and the current (i'th) MB.

The pixels that lie in the window $W_i$ form the motion-compensated vector $u_i=[u_{i,1,0,0}, \ldots, u_{i,6,7,7}]$ that is stored in the motion compensation unit (706). Thus, the motion estimation unit (702) is operably coupled to the frame buffer (704), and provides a motion compensated vector to the motion compensation unit (706), which is also operably coupled to the frame buffer (704). The mode unit (710) that is operably coupled to receive the input vector $r_i$ determines the encoding mode (Inter/Intra?). The prediction $p_i=[p_{i,1,0,0}, \ldots, p_{i,6,7,7}]$ of the input vector $r_i$ is obtained from $u_i$ based on the encoding mode of the current MB:

a. In the intra mode, set $p_i=0$.
b. In the inter (predictive) mode:
b1. If the loop filter (708) is "out," set $p_i=u_i$.
b2. If the loop filter (708) is "in," filter the elements of $u_i$ (block-by-block) using a separable, two-dimensional, 3-tap FIR filter, and set the output of the loop filter equal to $p_i$.

In each case, the loop filter (708) is operably coupled to the motion compensation unit (706) to operate as set forth above.

At the first adder (712), the vector $p_i$ is subtracted from the input $r_i$ to obtain the prediction error vector $e_i=[e_{i,1,0,0}, \ldots, e_{i,6,7,7}]=r_i-p_i$. The vector $e_i$ is transformed to find $E_i=[E_{i,1,0,0}, \ldots, E_{i,6,7,7}]=A[e_i]$, where A[ ] here represents the Discrete Cosine Transform (DCT) at a DCT unit (714) that is operably coupled to the first adder (712). The DCT is applied independently to each 8×8 block in the MB to obtain the transform coefficients $E_{i,k,s,t}$ according to:

$$E_{i,k,s,t}=0.25\ C(s)\ C(t) \sum\sum\ 0\leq m,n\leq 7\ r_{i,k,m,n}\cos[\pi(2m+1)s/16]\cos[\pi(2n+1)t/16],$$

where $C(s)=1/\sqrt{2}$ for s=0, and 1 otherwise, and $C(t)=1/\sqrt{2}$ for t=0, and 1 otherwise. Here s and t are the transform domain variables. Note that the same transformation A[ ] is used in every MB. FIG. 9, numeral 900, shows how the indices t (902) and s (904), both in the range 0 to 7, are used in the transform domain.

A quantizer (716) is operably coupled to receive the transform coefficients $E_{i,k,s,t}$ and quantizes the coefficients using a scalar quantizer which is uniform with step size $\Delta_i$ except for a dead-zone around 0. The reconstruction values of the quantizer are {0, $\pm a_i$, $\pm(a_i+\Delta_i)$, $\pm(a_i+2\Delta_i)$, ..., $-2048 \leq \pm(a_i+126\Delta_i) < 2048$}, where $\Delta_i=2, 4, \ldots, 62$ and $a_i=3\Delta_i/2$ when $\Delta_i$ is odd and $a_i=3\Delta_i/2-1$, otherwise. The same step size $\Delta_i$ is utilized for all transform coefficients in the MB, except in the intra mode, the sample $E_{i,k,0,0}$ is quantized using a uniform scalar quantizer of step size $\Delta_i=8$ with no dead-zone (also, since $E_{i,k,0,0} \geq 0$, only the positive reconstruction values are needed in this case). The decision regions of the quantizer are selected to improve the image quality as much as possible.

The output of the quantizer (716) is the quantized transform vector $Y_i=[Y_{i,1,0,0}, \ldots, Y_{i,6,7,7}]=E_i+D_i$, where $D_i=[D_{i,1,0,0}, \ldots, D_{i,6,7,7}]$ is the quantization error vector.

The quantized vector $Y_i$ is input into an inverse DCT unit (724) and is further transformed to generate the vector $y_i=[y_{i,1,0,0}, \ldots, y_{i,6,7,7}]=A^{-1}[Y_i]$, where $A^{-1}[\ ]$ is an inverse DCT. The pixels $y_{i,k,m,n}$ are determined according to:

$$y_{i,k,m,n}=0.25 \sum\sum\ 0\leq s,t\leq 7\ C(s)\ C(t)\ Y_{i,k,s,t}\cos[\pi(2m+1)s/16]\cos[\pi(2n+1)t/16].$$

The vector $p_i$ is input to a second adder (726) and is added to $y_i$ to obtain the reconstructed vector $z_i=[z_{i,1,0,0}, \ldots, z_{i,6,7,7}]=y_i+p_i$, and the pixels $z_{i,k,m,n}$ are stored in the frame buffer (704).

The quantized transform coefficients $Y_{i,k,s,t}$ are typically encoded into a CBR bit stream, for example, by utilizing a variable-length encoder (720) with an output buffer (722) and then transmitted (or stored). First the coefficients in each block are converted from the 8×8 matrix format into a serial format using what is known as 'zig-zag scanning' (see FIG. 9), and then the coefficients in each block are represented by a sequence of (Run, Level) values where "Run" represents the number of zeroes before the next non-zero value "Level." These (Run, Level) values are then encoded using a binary variable-length code. The output of the variable-length encoder is typically buffered (720) in order to generate a CBR bit stream, and the quantization step size is adjusted by a quantizer control unit (718) to prevent buffer overflows (or underflows). The quantizer control unit (718) is operably coupled to the buffer (722) and provides an adjusting signal to the quantizer (716).

In addition to the quantized transform coefficients $Y_{i,k,s,t}$, the encoder also transmits side information to allow the decoder to correctly reconstruct the coded signal. Side information includes the source format (CIF/QCIF), quantizer step size $\Delta_i$, inter/intra decision, motion vector $m_i$ (in inter mode only) and the loop filter in/out (when motion vector is present).

The step size $\Delta_i$ can be kept fixed for an entire GOB. In that case, only one step size value per GOB needs to be transmitted as side information. It is also possible to change $\Delta_i$ inside the GOB. This provides a finer adjustment of the step size at the expense of a larger overhead.

The H.261 encoder also transmits side information to allow the encoder skip a block or a MB. For example, when all the coefficients $Y_{i,k,s,t}$ in an 8×8 block are zero, the encoder does not code these blocks at all. Similarly, when there is little motion, or when the motion estimation is nearly perfect, all coefficients in a MB may be zero. In that case, the encoder may skip the entire MB. When a block or a MB is skipped in the encoder, the decoder simply substitutes zeroes for the missing coefficients.

The maximum image rate in H.261 is approximately 30 images/sec, but the Recommendation allows the encoder to regularly skip 0, 1, 2 or 3 images to achieve effective image rates of 30, 15, 10 and 7.5 images/sec. The encoder may also skip an image occasionally. This can be used, for example, immediately after encoding an image in the intra mode. Since the intra mode typically generates a large number of bits, skipping an image can help reduce the buffering delay.

The rate of a bit stream generated by an H.261 encoder can be changed using the transcoder of the present invention. A transcoder first decodes the received bit stream using a decoder for the variable-length code to obtain the sequence of (Run, Level) values, and then recovers the sequence of quantized vectors $Y_i=[Y_{i,1,0,0}, \ldots, Y_{i,6,7,7}]$ generated by the encoder. The decoder also recovers all side information. If a block or MB is not coded, the decoder inserts zeroes for the corresponding missing coefficients.

Typical subsequent operations of the one-step transcoder are described below (see FIG. 10, numeral 1000). A variable-length decoder (1002) outputs vector $Y_i$ to a first adder (1004) and provides framing information, inter/intra information, information about which blocks are coded (coded block pattern or CBP), step size $\Delta_i$, motion vectors $m_i$ and loop filter information to various elements of the transcoder along a feedforward path. The first adder (1004) combines vector $Y_i$ and a modified quantization error vector $S_i$ to provide vector $E_i'$ to a quantizer (1006) and to a second adder (1014). The quantizer (1006) is operably coupled to the first adder (1004) and provides a quantized output vector $Y_i'$ to a variable-length encoder (1010) and to the second adder (1014). The variable length encoder (1010) is operably coupled to the quantizer (1006) and to receive information from the variable-length decoder (1002) and generates the output bits. The buffer (1012) is operably coupled to the variable-length encoder (1010) and provides a means for storing output bits before transmission and also provides an input to a quantizer control (1008). The quantizer control (1008) is operably coupled to the buffer (1012) and provides a control signal to the quantizer (1006) as described more fully above. The second adder (1014) is operably coupled to receive the vectors $E_i'$ and $Y_i'$ and provides $D_i'=E_i'-Y_i'$. An inverse DCT unit (1016) is operably coupled to the second adder (1014) and provides an inverse transform vector $d_i'$. The frame buffer (1018) is operably coupled to the inverse DCT unit (1016) and provides output vector $z_i$. A motion compensation unit (1020) is operably coupled to the frame buffer and to receive a motion vector from the variable-length decoder (1002) and is utilized to provide an output vector $w_i$. The loop filter (1022) is operably coupled to the motion compensation unit (1020), receives in/out loop filter information from the variable-length decoder (1002), and outputs the predicted quantization error vector $s_i$. A DCT unit (1024) is operably coupled to the loop filter (1022) and outputs vector $S_i$.

The above-cited vectors are further described as follows:

(1) No motion estimation is performed in the transcoder. Instead, the motion vector $m_i=(m_{i1}, m_{i2})$ received from the encoder is used to determine the 16×16 window $W_i$, and the pixels in the transformed quantization error buffer (see below) that lie in that window are used to form the vector $w_i=[w_{i,1,0,0}, \ldots, w_{i,6,7,7}]$. Again, the motion vector $m_i$ represents the spatial offset between the window $W_i$ and the current (i'th) MB.

The predicted quantization error vector $s_i=[s_{i,1,0,0}, \ldots, s_{i,6,7,7}]$ is obtained from $w_i$ based on the encoding mode of the current MB:

a. In the intra mode, set $s_i=0$.
b. In the inter (predictive) mode:
  b1. If the loop filter is out, set $s_i=w_i$.
  b2. If the loop filter is in, filter the elements of $w_i$ (block-by-block) using a separable, two-dimensional 3-tap FIR filter, and set the output of the filter equal to $s_i$.

(2) The vector $s_i$ is transformed again to obtain the modified quantization error vector $S_i=A[s_i]$, where A[ ] represents the DCT operation, according to:

$$S_{i,k,s,t}=0.25\ C(s)\ C(t) \sum\sum_{0 \le m,n \le 7} s_{i,k,m,n} \cos[\pi(2m+1)s/16] \cos[\pi(2n+1)t/16].$$

(3) The modified quantization error vector $S_i=[S_{i,1,0,0}, \ldots, S_{i,6,7,7}]$ is subtracted from the coded vector $Y_i$ to obtain the error vector $E_i'=[E'_{i,1,0,0}, \ldots, E'_{i,6,7,7}]=Y_i-S_i$.

(4) The coefficients $E'_{i,k,s,t}$ are (re)-quantized using an H.261 quantizer as in the encoder, possibly with a different step size $\Delta_i'$, except for the term $E'_{i,k,0,0}$ in the intra mode the same step size is used: $\Delta_i=\Delta_i'=8$. The result is the transcoded transform vector $Y_i'=[Y'_{i,1,0,0}, \ldots, Y'_{i,6,7,7}]=E_i'+D_i'$, where $D_i'=[D'_{i,1,0,0}, \ldots, D'_{i,6,7,7}]$ is the quantization noise vector for the transcoder.

(5) The error vector $E_i'$ is subtracted from $Y_i'$ to obtain the quantization error vector $D_i'$, and then $D_i'$ is inverse transformed using an inverse DCT to obtain $d_i'=A^{-1}[D_i']$:

$$d'_{i,k,m,n}=0.25 \sum\sum_{0 \le s,t \le 7} C(s)\ C(t)\ D'_{i,k,s,t} \cos[\pi(2m+1)s/16] \cos[\pi(2n+1)t/16];$$

The pixels $d'_{i,k,m,n}$ are stored in a reconstructed quantization frame buffer for future iterations.

In the following example, the transcoder uses the motion vector $m_i$, the inter/intra decision and the loop filter decision received from the H.261 encoder without any modifications. The source format (CIF/QCIF) is also not modified. This greatly simplifies the implementation of the transcoder.

The transcoder converts the transcoded sequence $Y_i'$ into a bit stream using a noiseless source encoder as in the H.261 encoder.

The bit stream generated by the transcoder is typically decoded by an H.261 decoder, as shown in FIG. 11, numeral 1100. Here, after recovering the sequence $Y_i'$ from the received bit stream as usual, the decoder reconstructs the signal $z_i'=[z_{i,1,0,0}, \ldots, z_{i,6,7,7}]=r_i+d_i+d_i'$, as follows:

(1) The received vector $Y_i'$, typically output by a variable-length decoder (1102), is first transformed using an inverse DCT unit (1104) that is operably coupled to the variable-length decoder (1102), wherein the inverse DCT unit (1104) determines an inverse DCT to obtain the vector $y_i'=[y'_{i,1,0,0}, \ldots, y'_{i,6,7,7}]$:

$$y'_{i,k,m,n}=0.25 \sum\sum_{0 \le s,t \le 7} C(s)C(t)\ Y'_{i,k,s,t} \cos[\pi(2m+1)s/16] \cos[\pi(2n+1)t/16].$$

An adder (1106) is operably coupled to the inverse DCT unit (1104) and to a loop filter (1108) to combine $Y_i'$ and $p_i'$, and generate output vector $z_i'$. Vector $z_i'$ is an output of the H.261 decoder and is also utilized as a feedback vector to a frame buffer (1112).

(2) A motion compensation unit (1110) is operably coupled to receive the output of the frame buffer (1112) and a motion vector $m_i=(m_{i1}, m_{i2})$ from the encoder that is used to determine a 16×16 window $W_i$. The pixels in the reconstruction buffer that lie in that window are used to form the vector $u_i'=[u'_{i,1,0,0}, \ldots, u'_{i,6,7,7}]$.

A loop filter (1108) is operably coupled to the motion compensation unit (1110) for providing vector $p_i'$ to the adder (1106). The prediction value $p_i'=[p'_{i,1,0,0}, \ldots, p'_{i,6,7,7}]$ is obtained from $u_i'$ based on the encoding mode of the current MB:

a. In the intra mode, set $p_i'=0$.
b. In the predictive (inter) mode:
  b1. If the loop filter (1108) is out, set $p_i'=u_i'$.
  b2. If the loop filter (1108) is in, filter the elements of $u_i'$ (block-by-block) using a separable, two-dimensional 3-tap FIR filter, and set the output of the filter equal to $p_i'$.
(3) The vector $p_i'$ is added to $y_i'$ to obtain the reconstructed vector $z_i'=y_i'+p_i'$.

The overall quantization error is then the sum of the quantization errors $d_i$ and $d_i'$ introduced by the encoder and the transcoder, respectively.

FIG. 12, numeral 1200, is a flow chart of one embodiment of the steps in accordance with the method of the present invention. The method provides for transcoding a sequence of quantized vectors $Y_i$ generated by a predictive waveform encoder utilizing modified quantization error vectors $S_i$. The vectors cited below are described with greater particularity above.

The method comprises the steps of: (1) generating a difference vector $E_i'=Y_i-S_i$ between at least a first quantized vector $Y_i$ and a modified quantization error vector $S_i$ (1202); (2) quantizing the difference vector $E_i'$ to obtain a transcoded vector $Y_i'$ (1204); (3) receiving at least two of the vectors $Y_i$, $E_i'$ and $Y_i'$ and generating the inverse-transformed error vector $d_i'=A_i^{-1}[D_i']$, where $D_i'$ is a quantization error vector and $A_i^{-1}$ is an inverse transformation (1206); and generating the modified quantization error vector $S_i$ based on past values of the vector $d_i'$ (1208).

As described for the device of the present invention, the transformation $A_i^{-1}$ may be selected to be constant, the quantized vector $Y_i$ may have dimensionality L=1, and the inverse transformation $A_i^{-1}[\ ]$ may be an identity matrix.

The step of generating the modified quantization error vector $S_i$ based on past values of the vector $d_i'$ may be selected to include: (1) generating a predicted quantization error vector $s_i$, and (2) utilizing $s_i$ to generate a modified quantization error vector $S_i$ such that $S_i=A_i[s_i]$ where $A_i$ is a predetermined transformation. In addition, this step may include one of (1)–(2):

(1) utilizing received vectors $Y_i'$ and $E_i'$, for determining a quantization error $D_i'=Y_i'-E_i'$, and utilizing an inverse transformation $A_i^{-1}$ to generate the vector $d_i'$ according to $d_i'=A_i^{-1}[D_i']$, and (2) receiving and utilizing vectors $Y_i$ and $Y_i'$ for determining an error $X_i'=Y_i'-Y_i$, utilizing inverse transformation $A_i^{-1}$ for generating a vector $x_i$ according to $x_i=A_i^{-1}[X_i']$, and adding $x_i$ and $s_i$ to obtain the vector $d_i'$.

The quantized vector $Y_i$ may be generated by a predictive digital video encoder and represents quantized transform coefficients of a macro block (MB), a fundamental coding element in H.261. A motion-compensated prediction (MCP) may be utilized for prediction. Transformation A[ ] is a Discrete Cosine Transform (DCT).

In one embodiment, the video encoder may be selected to be an H.261 encoder.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A device for transcoding a sequence of quantized vectors $Y_i$ generated by a predictive waveform encoder utilizing modified quantization error vectors $S_i$, comprising:

(A) an adder, operably coupled to receive at least a first quantized vector $Y_i$ and at least a first modified quantization error vector $S_i$, for generating a difference vector $E_i'=Y_i-S_i$ between the quantized vector $Y_i$ and the modified quantization error vector $S_i$;

(B) a quantizer, operably coupled to the adder, for quantizing the difference vector $E_i'$ to obtain a transcoded vector $Y_i'$;

(C) a quantization error vector calculator (QEVC), operably coupled to receive at least two of the vectors $Y_i$, $E_i'$ and $Y_i'$, for generating an inverse-transformed error vector $d_i'=A_i^{-1}[D_i']$, where $D_i'$ is a quantization error vector and $A_i^{-1}$ is an inverse transformation; and (D) modifying circuitry, operably coupled to the QEVC, for generating a modified quantization error vector $S_i$ based on past values of the vector $d_i'$, where $S_i$ is input to the adder.

2. The device of claim 1, wherein said inverse transformation $A_i^{-1}$ is constant.

3. The device of claim 2, where the inverse transformation $A_i^{-1}$ is linear.

4. The device of claim 3, wherein said quantized vector $Y_i$ has dimensionality L=1.

5. The device of claim 4, wherein said inverse transformation $A_i^{-1}$ is an identity matrix.

6. The device of claim 3, wherein said modifying circuitry includes:

a predictor, operably coupled to the quantization error vector calculator, for generating a predicted quantization error vector $s_i$, and a transformation unit, operably coupled to the predictor, for utilizing a forward transformation $A_i[\ ]$ for generating the modified quantization error vector $S_i$.

7. The device of claim 6, wherein said quantization error vector calculator includes:

a second adder, operably coupled to receive $Y_i'$ and $E_i'$, for determining the quantization error $D_i'=Y_i'-E_i'$, and an inverse transformation unit, operably coupled to receive $D_i'$, for utilizing an inverse transformation $A_i^{-1}$ to generate the vector $d_i'$ according to $d_i'=A_i^{-1}[D_i']$.

8. The device of claim 6, wherein said quantization error vector calculator includes:

a second adder, operably coupled to receive $Y_i$ and $Y_i'$, for determining an error $X_i'=Y_i'-Y_i$, an inverse transformation $A_i^{-1}$ unit, operably coupled to the second adder, for generating a vector $x_i$ according to $x_i=A_i^{-1}[X_i']$, and a third adder, operably coupled to receive the vector $x_i$ from the inverse transformation unit and to receive a feedback signal $s_i=A_i^{-1}[X_i']$ from the predictor, for adding $x_i$ and $s_i$ to obtain the vector $di'$.

9. The device of claim 6 wherein the quantized vector $Y_i$ is generated by a predictive digital video encoder.

10. The device of claim 6 wherein said quantized vector $Y_i$ represents quantized transform coefficients of a macro block (MB).

11. The device of claim 9, wherein said predictor uses motion-compensated prediction (MCP) and transformation A[ ] is a Discrete Cosine Transform (DCT) and transformation $A^{-1}$ is an inverse Discrete Cosine Transform (IDCT).

12. The device of claim 11, wherein said video encoder is an H.261 encoder.

13. A method for transcoding a sequence of quantized vectors Yi generated by a predictive waveform encoder utilizing modified quantization error vectors $S_i$, comprising the steps of:

(A) generating a difference vector $E_i'=Y_i-S_i$ between at least a first quantized vector $Y_i$ and a modified quantization error vector $S_i$;

(B) quantizing the difference vector $E_i'$ to obtain a transcoded vector $Y_i'$;

(C) receiving at least two of the vectors $Y_i$, $E_i'$ and $Y_i'$ and generating an inverse-transformed error vector $d_i'=A_i^{-1}[D_i']$, where $D_i'$ is a quantization error vector and $A_i^{-1}$ is an inverse transformation; and (D) generating the modified quantization error vector $S_i$ based on past values of the vector $d_i'$.

14. The method of claim 13, wherein said inverse transformation $A_i^{-1}$ is constant.

15. The device of claim 14, where the inverse transformation $A_i^{-1}$ is linear.

16. The method of claim 15 wherein said quantized vector $Y_i$ has dimensionality L=1.

17. The method of claim 16, wherein said inverse transformation $A_i^{-1}$ is an identity matrix.

18. The method of claim 15 wherein the step of generating the modified quantization error vector $S_i$ based on past values of the vector $d_i'$ includes:

generating a predicted quantization error vector $s_i$, and utilizing $s_i$ to generate the modified quantization error vector $S_i$ such that $S_i=A_i[s_i]$ where $A_i$ is a predetermined transformation.

19. The method of claim 18, further including:

utilizing received vectors $Y_i'$ and $E_i'$, for determining a quantization error $D_i'=Y_i'-E_i'$, and utilizing an inverse transformation $A_i^{-1}$ to generate the vector $d_i'$ according to $d_i'=A_i^{-1}[D_i']$.

20. The method of claim 18, further including:

receiving and utilizing vectors $Y_i$ and $Y_i'$ for determining an error $X_i'=Y_i'-Y_i$, utilizing inverse transformation $A_i^{-1}$ for generating a vector $x_i$ according to $x_i=A_i^{-1}[X_i']$, and adding $x_i$ and $s_i$ to obtain the vector $d_i'$.

21. The method of claim 18 wherein the quantized vector $Y_i$ is generated by a predictive digital video encoder.

22. The method of claim 18 wherein said quantized vector $Y_i$ represents quantized transform coefficients of a macro block (MB), a fundamental coding element in H.261.

23. The method of claim 22, further including utilizing motion-compensated prediction (MCP), and wherein transformation A[ ] is a Discrete Cosine Transform (DCT) and transformation $A^{-1}$ is an inverse Discrete Cosine Transform (IDCT).

24. The method of claim 21, wherein said video encoder is an H.261 encoder.

25. A transcoding device for converting a sequence of quantized vectors $Y_i$ generated by a predictive waveform encoder utilizing modified quantization error vectors $S_i$, comprising:

(A) an adder, operably coupled to receive at least a first quantized vector $Y_i$ and at least a first modified quantization error vector $S_i$, for generating a difference vector $E_i'=Y_i-S_i$ between the quantized vector $Y_i$ and the modified quantization error vector $S_i$;

(B) a generalized quantizer, operably coupled to the adder and having a quantization error vector calculator, for quantizing the difference vector $E_i'$ to obtain a transcoded vector $Y_i'$, receiving at least one of the vectors $Y_i$ and $E_i'$, for generating an inverse-transformed error vector $d_i'=A_i^{-1}[D_i']$, where $D_i'$ is a quantization error vector and $A_i^{-1}$ is an inverse transformation; and (C) modifying circuitry, operably coupling the quantization error vector calculator to the adder, for generating the modified quantization error vector $S_i$ based on past values of the vector $d_i'$.

26. The device of claim 25, wherein said inverse transformation $A_i^{-1}$ is constant.

27. The device of claim 26, where the inverse transformation $A_i^{-1}$ is linear.

28. The device of claim 27, wherein said quantized vector $Y_i$ has dimensionality L=1.

29. The device of claim 28, wherein said inverse transformation $A_i^{-1}$ is an identity matrix.

30. The device of claim 27, wherein said modifying circuitry includes:

a predictor, operably coupled to the generalized quantizer, for generating a predicted quantization error vector $s_i$, and a transformation unit, operably coupled to the predictor, for utilizing a forward transformation $A_i[\ ]$ for generating the modified quantization error vector $S_i$.

31. The device of claim 30, wherein said generalized quantizer includes:

a quantizer, operably coupled to the adder, for quantizing an input vector $E_i'$ to provide $Y_i'$, a second adder, operably coupled to receive $E_i'$ and $Y_i'$, for determining the quantization error $D_i'=Y_i'-E_i'$, where $Y_i'$ represents a quantized vector for an input $E_i'$ and an inverse transformation unit, operably coupled to receive $D_i'$, for utilizing an inverse transformation $A_i^{-1}$ to generate the vector $d_i'$ according to $d_i'=A_i^{-1}[D_i']$.

32. The device of claim 30, wherein said quantization error vector calculator includes:

a second adder, operably coupled to receive $Y_i$ and $Y_i'$, for determining an error $X_i'=Y_i'-Y_i$, an inverse transformation $A_i^{-1}$ unit, operably coupled to the second adder, for generating a vector $x_i$ according to $x_i=A_i^{-1}[X_i']$, and a third adder, operably coupled to receive the vector $x_i$ from the inverse transformation unit and to receive a feedback signal $s_i=A_i^{-1}[X_i']$ from the predictor, for adding $x_i$ and $s_i$ to obtain the vector $d_i'$.

33. The device of claim 30 wherein the quantized vector $Y_i$ is generated by a predictive digital video encoder.

34. The device of claim 30 wherein said quantized vector $Y_i$ represents quantized transform coefficients of a macro block (MB).

35. The device of claim 30, wherein said predictor uses motion-compensated prediction (MCP) and transformation A[ ] is a Discrete Cosine Transform (DCT) and transformation $A^{-1}$ is an inverse Discrete Cosine Transform (IDCT).

36. The device of claim 33, wherein said video encoder is an H.261 encoder.

* * * * *